(12) United States Patent
Naiki et al.

(10) Patent No.: US 12,197,197 B2
(45) Date of Patent: Jan. 14, 2025

(54) LOW TOUGHNESS WORKPIECE CUTTING APPARATUS, LOW TOUGHNESS WORKPIECE MANUFACTURING METHOD AND RECORDING MEDIUM STORING LOW TOUGHNESS WORKPIECE MANUFACTURING PROGRAM

(71) Applicants: MITSUBISHI HEAVY INDUSTRIES, LTD., Tokyo (JP); Mitsubishi Heavy Industries Aero Engines, Ltd., Aichi (JP); NATIONAL UNIVERSITY CORPORATION TOKAI NATIONAL HIGHER EDUCATION AND RESEARCH SYSTEM, Aichi (JP)

(72) Inventors: Yukio Naiki, Tokyo (JP); Shiro Nagami, Tokyo (JP); Keigo Matsunaga, Tokyo (JP); Koji Mizutani, Tokyo (JP); Eiji Shamoto, Aichi (JP); Takehiro Hayasaka, Aichi (JP); Shota Yoshino, Aichi (JP)

(73) Assignees: MITSUBISHI HEAVY INDUSTRIES, LTD., Tokyo (JP); MITSUBISHI HEAVY INDUSTRIES AERO ENGINES, LTD., Aichi (JP); NATIONAL UNIVERSITY CORPORATION TOKAI NATIONAL HIGHER EDUCATION AND RESEARCH SYSTEM, Aichi (JP)

( * ) Notice: Subject to any disclaimer, the term of this patent is extended or adjusted under 35 U.S.C. 154(b) by 360 days.

(21) Appl. No.: 17/636,174

(22) PCT Filed: Jan. 15, 2021

(86) PCT No.: PCT/JP2021/001238
§ 371 (c)(1),
(2) Date: Feb. 17, 2022

(87) PCT Pub. No.: WO2021/181865
PCT Pub. Date: Sep. 16, 2021

(65) Prior Publication Data
US 2022/0334565 A1    Oct. 20, 2022

(30) Foreign Application Priority Data

Mar. 12, 2020 (JP) ............................... 2020-042572

(51) Int. Cl.
G05B 19/418 (2006.01)
(52) U.S. Cl.
CPC .............. G05B 19/41875 (2013.01); G05B 2219/32194 (2013.01)
(58) Field of Classification Search
CPC ... G05B 19/00; G05B 19/41875; G05B 15/02
(Continued)

(56) References Cited

U.S. PATENT DOCUMENTS 6,438,445 B1    8/2002   Yoshida et al.
7,933,679 B1 *  4/2011   Kulkarni ............ G05B 13/0265
                                              703/2
(Continued)

FOREIGN PATENT DOCUMENTS

CN    104298171 A  *  1/2015  ............. G05B 19/18
CN    106650001 A  *  5/2017
(Continued)

OTHER PUBLICATIONS

International Search Report issued Mar. 9, 2021 in International (PCT) Application No. PCT/JP2021/001238.
(Continued)

*Primary Examiner* — Ronald D Hartman, Jr.
(74) *Attorney, Agent, or Firm* — Wenderoth, Lind & Ponack, L.L.P.

(57) ABSTRACT

A low toughness workpiece cutting apparatus, a low toughness workpiece manufacturing method and a low toughness workpiece manufacturing program for predicting an occurrence of defect and/or non-occurrence of defect before a cutting process of low toughness material. A defect prediction device is provided with a storage device, a processor and an interface. The storage device stores tool data that represent physical characteristics and a shape of a tool, cutting data that represent a group of parameters of a cutting process to be performed to a workpiece by use of the tool and material data that represent physical characteristics and a shape of the workpiece. The processor performs an analysis of deformation of the workpiece due to a cutting force
(Continued)

and an analysis of fracture due to the deformation, and performs a prediction of an occurrence of defect and/or a non-occurrence of defect of the workpiece due to the cutting process.

14 Claims, 14 Drawing Sheets

(58) Field of Classification Search
USPC .......................................................... 700/117
See application file for complete search history.

(56) References Cited

U.S. PATENT DOCUMENTS

| | | | | |
|---|---|---|---|---|
| 8,788,083 | B2* | 7/2014 | Atabey | G05B 19/404 700/184 |
| 10,921,789 | B2* | 2/2021 | Kadokura | G05B 19/41875 |
| 2007/0016325 | A1* | 1/2007 | Esterling | G05B 19/4065 700/175 |
| 2009/0287458 | A1* | 11/2009 | El-Wardany | B23D 43/04 703/2 |
| 2014/0123740 | A1* | 5/2014 | Yoshikawa | G05B 19/406 73/104 |
| 2017/0227945 | A1* | 8/2017 | Wang | G05B 19/182 |
| 2018/0188708 | A1* | 7/2018 | Azuma | G05B 19/402 |
| 2020/0064809 | A1* | 2/2020 | Sanders | G06F 30/17 |

FOREIGN PATENT DOCUMENTS

| | | | | |
|---|---|---|---|---|
| CN | 107065765 A | * | 8/2017 | ............. G05B 19/19 |
| CN | 107832546 A | * | 3/2018 | ......... G06F 17/5009 |
| CN | 108182325 A | * | 6/2018 | ............. G06F 30/17 |
| CN | 106 695 457 | | 8/2018 | |
| CN | 106156430 B | * | 4/2019 | ......... G06F 17/5018 |
| CN | 110 480 429 | | 2/2020 | |
| CN | 110188446 B | * | 7/2021 | ......... G06F 17/5009 |
| EP | 0 945 771 | | 9/1999 | |
| JP | 09-264815 | | 10/1997 | |
| JP | 2003-019646 | | 1/2003 | |
| JP | 3916260 | | 5/2007 | |
| JP | 2018-202551 | | 12/2018 | |

OTHER PUBLICATIONS

Extended European Search Report issued Oct. 26, 2022 in corresponding European Patent Application No. 21768017.2.
Lianjie et al., "Theoretical model of crack propagation behavior and fracture chip formation mechanism during turning of fluorophlogopite ceramic", The International Journal of Advanced Manufacturing Technology, Springer, London, vol. 99, No. 9, Sep. 6, 2018, pp. 2585-2596.
English translation of the International Preliminary Report on Patentability issued Sep. 22, 2022 in International Application No. PCT/JP2021/001238.

* cited by examiner

LOW TOUGHNESS WORKPIECE CUTTING APPARATUS, LOW TOUGHNESS WORKPIECE MANUFACTURING METHOD AND RECORDING MEDIUM STORING LOW TOUGHNESS WORKPIECE MANUFACTURING PROGRAM

TECHNICAL FIELD

The present invention relates to a low toughness workpiece cutting apparatus that cuts a low toughness workpiece, a low toughness workpiece manufacturing method to manufacture a low toughness workpiece and a low toughness workpiece manufacturing program to be executed to manufacture a low toughness workpiece.

BACKGROUND

In a field of aerospace products, due to an increase of product performance requirement, introduction of intermetallic compounds having high specific strength at high temperatures is progressing. Intermetallic compounds have a low toughness, in other words intermetallic compounds have fragility, thus cutting process thereto is very difficult. Such a material is called a low toughness material or a brittle material. As other examples of low toughness materials, there are glass, ceramics and the like. In this document, as an example, materials with a fracture toughness value equal to or less than 30 MPa·m$^{1/2}$ will be collectively referred to as low toughness materials or brittle materials.

Among low toughness materials, intermetallic compounds in particular are difficult-to-cut materials with poor workability because of specific strength thereof that is relatively high at high temperature. As described above, because intermetallic compounds are low toughness materials and are difficult-to-cut materials also, a defect may relatively easily occur during a cutting process.

Milling process is known as a method of cutting a metallic material. In milling process, a workpiece is cut by rotating a tool such as an end mill at an appropriate rotation speed and moving the workpiece relative to the tool with an appropriate feed amount. During a cut process of an intermetallic compound by milling process, when the feed amount increases, on one hand cutting force increases, on the other hand likelihood of defect increases. However, when the feed amount decreases, a process efficiency of the cutting process (hereinafter also referred to as "cutting efficiency") decreases.

In relation with the above, Patent Literature 1 (Japanese Patent Publication No. H09-264815) discloses a method of measuring a strength of a composite material containing fragile particles. This method of measuring a strength is characterized in generating a virtual test piece with a same quality as a real test piece from a content rate and particle size of the fragile particles and fracture toughness value of a matrix.

CITED REFERENCE

Patent Literature

[Patent Literature 1] Japanese Patent Publication No. H09-264815

SUMMARY

A low toughness workpiece cutting apparatus, a low toughness workpiece manufacturing method and a low toughness workpiece manufacturing program will be provided to predict an occurrence of defect and/or a non-occurrence of defect before cutting process of low toughness material. Other objectives and new features will be clear from disclosures of the present description and attached diagrams.

According to an embodiment, a defect prediction device is provided with a storage device, a processor and an interface. The storage device stores tool data that represent physical characteristics and a shape of a tool, cutting data that represent a group of parameters of a cutting process to be performed to a workpiece by use of the tool and material data that represent physical characteristics and a shape of the workpiece. The processor performs, based on the tool data, the cutting data and the material data, an analysis of deformation of the workpiece due to a cutting force and an analysis of fracture due to the deformation, and performs a prediction of an occurrence of defect and/or a non-occurrence of defect of the workpiece due to the cutting process. The interface outputs a result of the prediction.

According to an embodiment, a defect predicting method includes: preparing tool data that represent physical characteristics and a shape of a tool, cutting data that represent a group of parameters of a cutting process to be performed to a workpiece by use of the tool and material data that represent physical characteristics and a shape of the workpiece; performing, based on the tool data, the cutting data and the material data, an analysis of deformation of the workpiece due to a cutting force and an analysis of fracture due to the deformation, performing a prediction of an occurrence of defect and/or a non-occurrence of defect of the workpiece due to the cutting process; and outputting a result of the prediction.

According to an embodiment, a low toughness workpiece manufacturing program includes: preparing tool data that represent physical characteristics and a shape of a tool, cutting data that represent a group of parameters of a cutting process to be performed to a workpiece by use of the tool and material data that represent physical characteristics and a shape of the workpiece; performing, based on the tool data, the cutting data and the material data, an analysis of deformation of the workpiece due to a cutting force and an analysis of fracture due to the deformation, performing a prediction of an occurrence of defect and/or a non-occurrence of defect of the workpiece due to the cutting process; and outputting a result of the prediction. Each step of the low toughness workpiece manufacturing program is executed by a computer.

According to the above embodiment, an occurrence of defect and/or a non-occurrence of defect can be predicted before a cutting process of a low toughness material.

DETAILED DESCRIPTION

An embodiment to carry out a low toughness workpiece cutting apparatus, a low toughness workpiece manufacturing method and a low toughness workpiece manufacturing program according to the present invention will be described below with reference to attached drawings.

In an embodiment, when performing cutting process to a low toughness material under a condition including a combination of a plurality of parameters, it will be predicted whether an undesired defect occurs or not by a computer simulation before performing the cutting process.

More specifically, from a perspective of fracture mechanics, it is considered as follows based on an assumption in that a defect such as an initial crack exists inside a workpiece. At first, a surface energy of the workpiece needs to increase for the crack to grow. Next, by a growth of such a crack, an elastic strain energy (hereinafter also referred to as "strain energy") of the workpiece is released and decreased. Herein, the inventors have focused on that, when an incremental of the surface energy and a decremental of the strain energy are compared, it can be considered that a defect occurs when the latter becomes greater than the former, in other words a prediction is established in that no defect occurs as long as the latter is smaller than the former.

In addition, from another perspective of fracture mechanics, a fracture toughness value $K_{1C}$ is defined as a physic characteristics value of a workpiece. The fracture toughness value $K_{1C}$ is a value that represents physical characteristics of toughness against fracture of the material. Furthermore, when cutting a workpiece by use of a tool, a stress intensity factor K based on parameters related to the cutting is defined. The stress intensity factor K is a physical quantity used in a field of fracture mechanics and the like to evaluate a strength of a material in which a crack or a defect exists and represents a strength of stress distribution near a tip of the crack or the defect. Herein, the inventors have focused on that, when the stress intensity factor K and the fracture toughness value $K_{1C}$ are compared, it can be considered that a defect occurs when the former becomes greater than the latter, in other words a prediction is established in that no defect occurs as long as the stress intensity factor K is smaller than the fracture toughness value $K_{1C}$.

Predicting an occurrence of defect by comparing an incremental of a surface energy and a decremental of a strain energy and predicting an occurrence of defect by comparing a fracture toughness value and a stress intensity factor are essentially the same. However, those two predictions differ in methods that are actually taken. Therefore, the former method and the latter method will be described as a first embodiment and a second embodiment, respectively.

Figure 1:
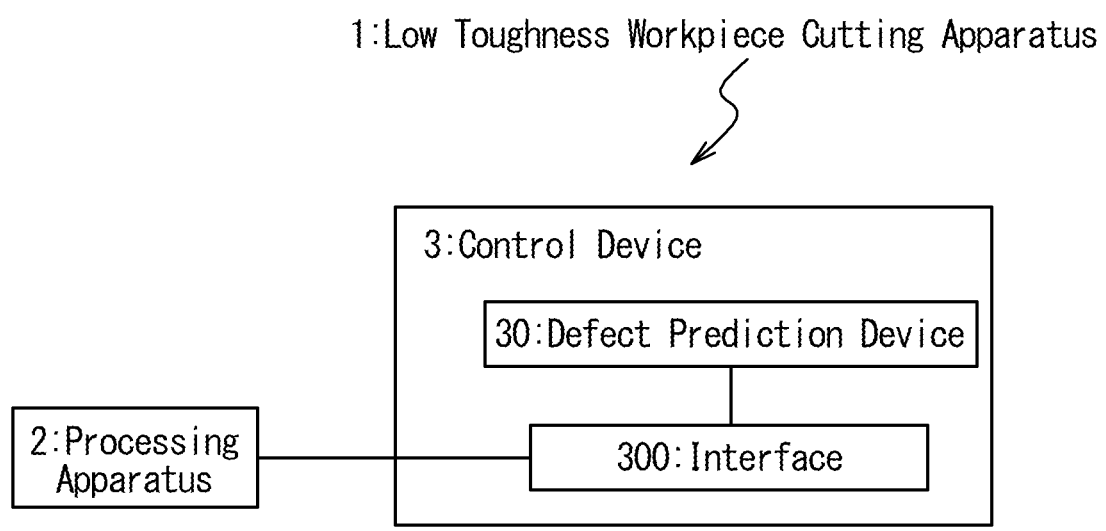
FIG. 1 is a block circuit diagram that shows a configuration example of a low toughness workpiece apparatus according to an embodiment.

(First embodiment) FIG. 1 is a block circuit diagram that shows a configuration example of a low toughness workpiece apparatus 1 according to an embodiment.

A configuration of the low toughness workpiece cutting apparatus 1 in FIG. 1 will be described. The low toughness workpiece cutting apparatus 1 is provided with a processing apparatus 2 and a control device 3. The processing apparatus 2 is configured to be able to perform a process including a cutting to a low toughness workpiece under control of the control device 3. The processing apparatus 2 is a Computer Numerical Control (CNC) Milling machine, for example. The control device 3 is configured to be able to control the processing apparatus 2 by executing a desired program stored in a non-illustrated storage device by a non-illustrated processor to generate a desired control signal. The control device 3 is provided with a defect prediction device 30 and an interface 300. The defect prediction device 30 predicts whether any defect occurs or not to a workpiece by a process performed by the processing apparatus 2 under a predetermined condition, before starting the process. It is preferable that the control device 3 generates, based on a result of this prediction, a control signal so that no defect occurs. This control signal may be a cutting program for operating the processing apparatus 2, or may be a group of parameters included in this cutting program. The interface 300 outputs this control signal. It is preferable that the processing apparatus 2 and the control device 3 are connected so as to be able to transmit or receive the control signal.

Figure 2A:
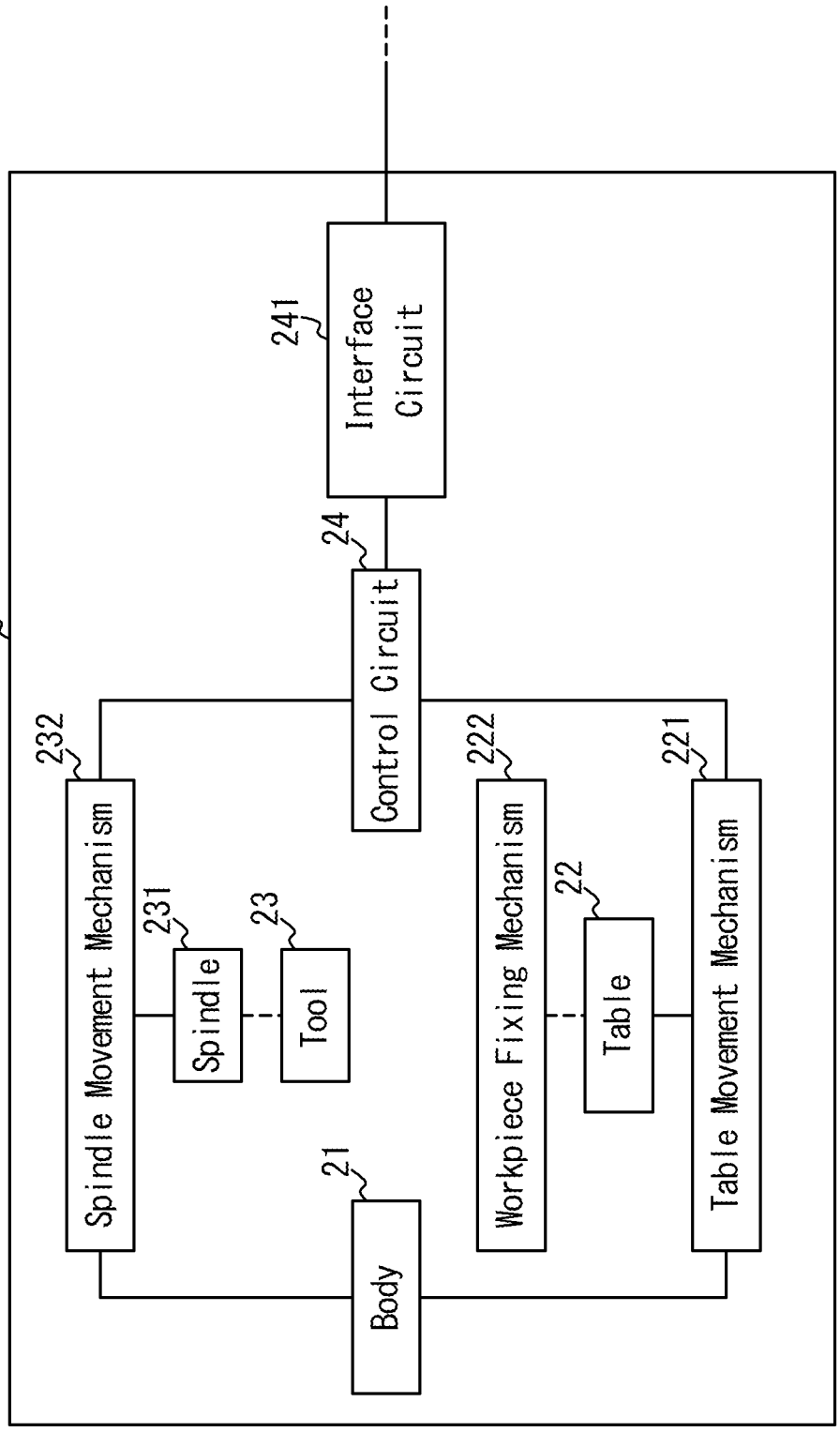
FIG. 2A is a block diagram that shows a configuration example of a processing apparatus according to an embodiment.

A configuration example of the processing apparatus 2 in FIG. 1 will be described. FIG. 2A is a block diagram that shows a configuration example of a processing apparatus 2 according to an embodiment. The processing apparatus 2 according to the present embodiment is, for example, a knee-type CNC milling machine. The processing apparatus 2 is provided with a body 21, a table 22, a table movement mechanism 221, a spindle 231, a spindle movement mechanism 232, a control circuit 24 and an interface circuit 241. In an embodiment, the body 21 is installed on the ground on one hand and supports the spindle movement mechanism 232 and the table movement mechanism 221 on the other hand. The table 22 is configured on one hand to fix a workpiece by use of a workpiece fixing mechanism 222 and is connected on the other hand to the body 21 through the table movement mechanism 221 so as to be movable with respect to the body 21 within a predetermined range. The table movement mechanism 221 controls a position of the table 22 under a control of the control circuit 24. The spindle 231 supports on one hand a tool 23 by a non-illustrated vise or the like, interchangeably, and is connected on the other hand to the spindle movement mechanism 232 that is fixed to the body 21, so as to be rotatable with respect to the spindle movement mechanism 232. Furthermore, the spindle 231 may be connected so as to be movable with respect to the spindle movement mechanism 232 within a predetermined range. The spindle movement mechanism 232 transmits a rotational power to the tool 23 connected to the spindle 231 by rotating the spindle 231 under a control of the control circuit 24. Furthermore, the spindle movement mechanism 232 may move the spindle 231 within a predetermined range under a control of the control circuit 24. The control circuit 24 is configured to receive a control signal from the control device 3 via the interface circuit 241 and control the table movement mechanism 221 and the spindle movement mechanism 232 in accordance with the control signal. It should be noted that the table 22 can be operated by a manual control of a user separately from the control by the control circuit 24. In addition, the spindle movement mechanism 232 can be operated by a manual control of a user separately from the control by the control circuit 24.

Figure 2B:
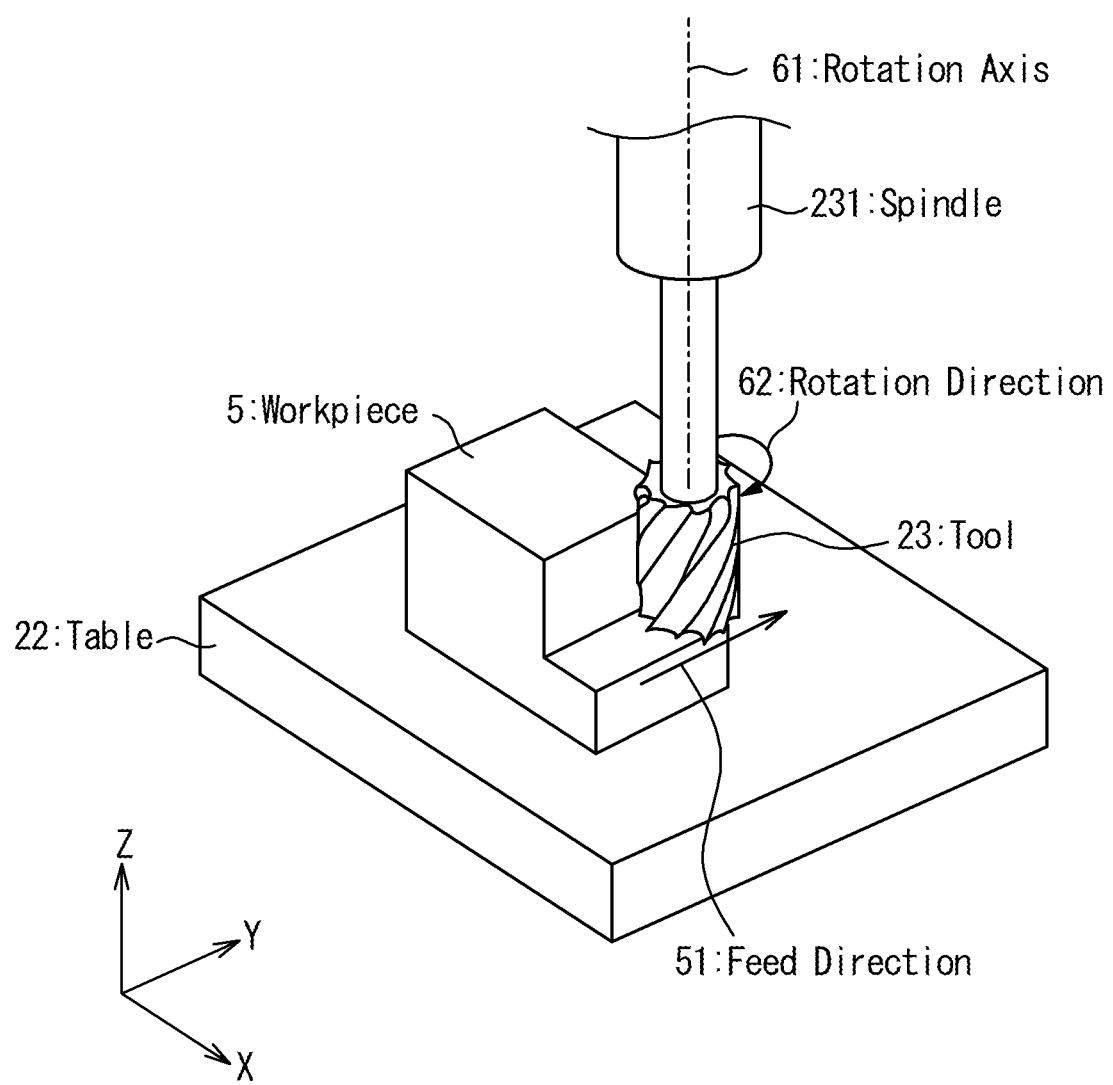
FIG. 2B is a perspective view that shows an example of a positional relationship of a table, a tool and a workpiece of a processing apparatus according to an embodiment.

An operation example of the processing apparatus 2 in FIG. 2A will be described. FIG. 2B is a perspective view that shows an example of a positional relationship of the table 22, the tool 23 and the workpiece 5 according to an embodiment. In an embodiment, the tool 23 is an end mill. An end mill is a tool used for a process such as cutting, has an approximately cylindrical shape and is provided with one or more blades on parts corresponding to a side surface and a bottom surface thereof. The end mill cuts, when rotating around a rotation axis 61 in a predetermined rotation direction 62, a part of the workpiece 5 in contact with a blade of the end mill. The end mill can continuously cut the workpiece 5 by moving one or both of the end mill and the workpiece 5. At that time, a direction in which the rotation axis 61 of the end mill moves with respect to the workpiece 5 is referred to as feed direction 51. In the example of FIG. 2B, Z axis of the cartesian coordinate XYZ and the rotation axis 61 are parallel, a plane XY and the surface of the table 22 are parallel, and Y direction and the feed direction 51 are parallel.

Figure 2C:
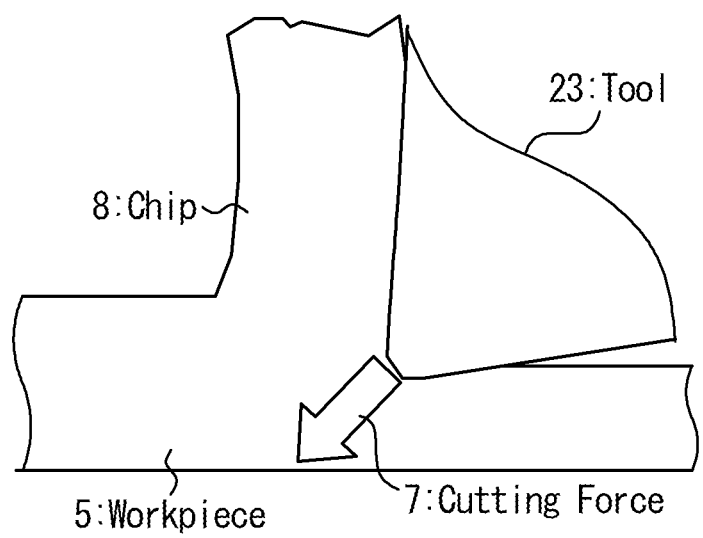
FIG. 2C is a partial cross section to describe a cutting force that is generated when a tool according to an embodiment cuts a workpiece.

FIG. 2C is a partial cross section to describe a cutting force 7 that is generated when the tool 23 according to an embodiment cuts the workpiece 5. The partial cross section of FIG. 2C shows an example of a state of a tip of the blade of the end mill in contact with an inside corner surface of the workpiece 5. At that time, a cutting force 7 is generated by a concentration of a rotation energy of the end mill and a kinetic energy of a relative movement of the end mill and the workpiece 5, at a part where the end mill and the workpiece 5 are in contact. In the example of FIG. 2C, the cutting force 7 acts in a direction from the end mill to the workpiece 5. However, to be more precise, the cutting force 7 does not necessarily have to be distributed in a same plane.

(Definition of a first energy amount) When the cutting force 7 is applied to the workpiece 5, a part of the workpiece 5 is separated from the workpiece 5 to become a chip 8, and a desired shape is formed on the surface of the workpiece 5. The cutting force 7, that is applied to the workpiece 5, can be calculated by a computer simulation to which parameters related to the workpiece 5, the tool 23 and the cutting condition are inputted. In addition, a decremental of the strain energy, that is reduced when a crack grows without changing a relative position of the tool 23 with respect to the workpiece 5 in a region where the cutting force 7 causes a deformation, can be calculated by a computer simulation. It should be noted that a distribution of strain in this region and strain energy stored in this region can be analyzed by a finite element method for example. The decremental of the strain energy calculated based on the cutting force 7 as described above will be hereinafter referred to as a first energy amount.

Figure 2D:
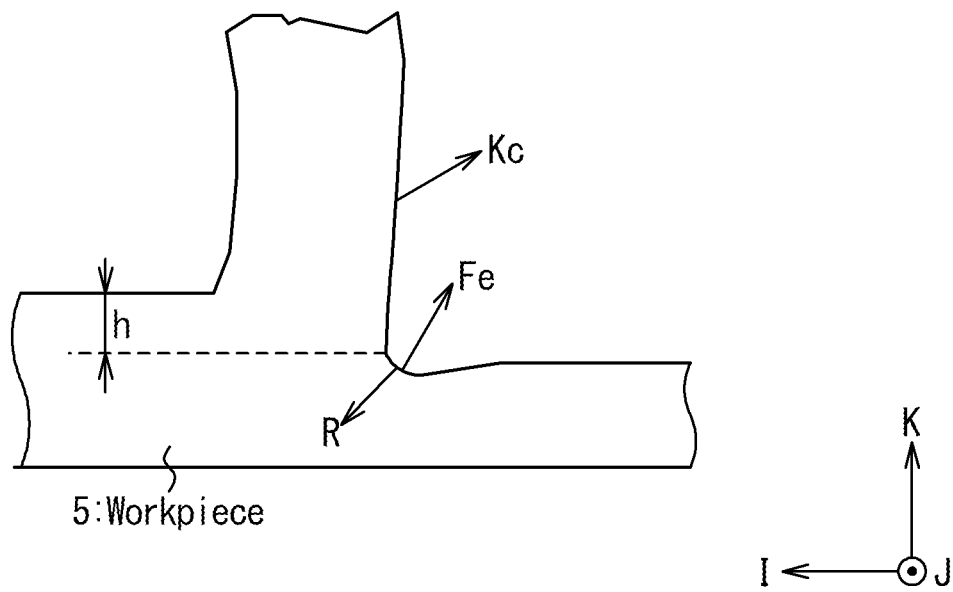
FIG. 2D is a partial cross section of a workpiece to describe a method of calculating a cutting force acting to the workpiece.
Figure 2E:
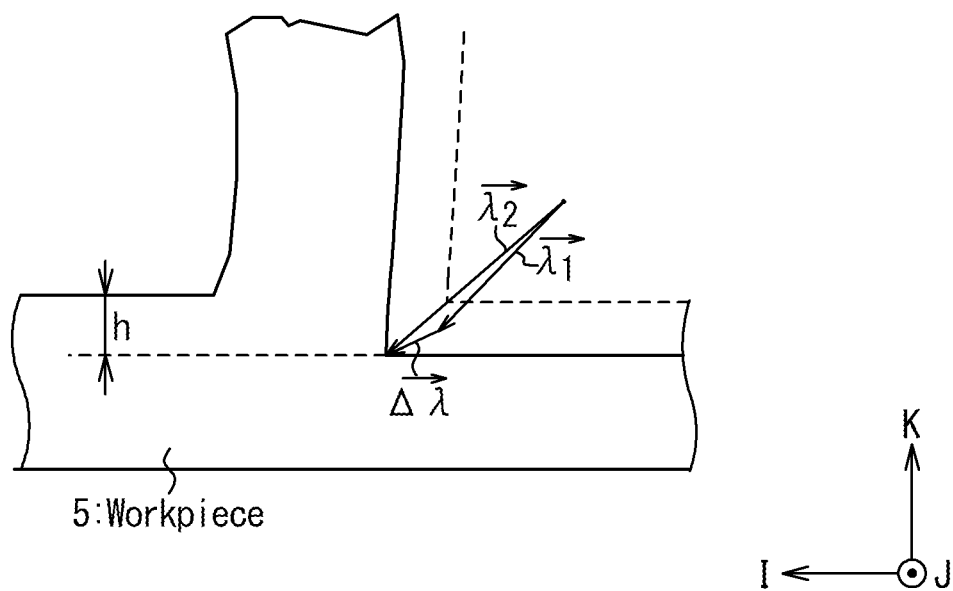
FIG. 2E is a partial cross section of a workpiece to describe a movement of a tool and a strain energy of the workpiece.

An example of another method of calculating the first energy amount will be described with reference to FIGS. 2D and 2E. FIG. 2D is a partial cross section of the workpiece 5 to describe a method of calculating a cutting force 7 acting to the workpiece 5. FIG. 2E is a partial cross section of the workpiece 5 to describe a movement of a tool 23 and a strain energy of the workpiece 5.

FIG. 2D shows the workpiece 5 extracted from FIG. 2C. In other words, the illustration of the tool 23 is omitted in FIG. 2D. When the tool 23 and the workpiece 5 relatively move and a part of the workpiece 5 is deformed to become the chip 8, a force referred to as a specific cutting resistance Kc (vector) and a force referred to as edge force Fe (vector) act from the workpiece 5 to the tool 23. Herein, symbols that are supposed to be expressed as vectors are described with "(vector)" immediately after. The specific cutting resistance Kc (vector) is a cutting resistance per unit area. The cutting resistance is a force that tries to push the tool 23 back when the workpiece 5 is being cut and is proportional to a cutting thickness h and a cutting width b. The edge force Fe (vector) is a force caused by a roundness of the tip of the blade of the tool 23 and is proportional to the cutting width b of the chip 8. It should be note that in the example in FIG. 2D an illustration in a direction of the cutting width b is omitted because this direction is parallel to an axis perpendicular to the paper surface. In the example of FIG. 2D, the direction of the cutting width b is noted as J axis, a direction of the movement of the tool 23 that is omitted from illustration is noted as I axis, and a direction orthogonal to both I axis and J axis is noted as K axis.

As described above, a force that acts from the workpiece 5 to the tool 23 when trying to cut the workpiece 5 by use of the tool 23 can be defined by the specific cutting resistance Kc (vector), the edge force Fe (vector), the cutting width b and the cutting thickness h. This force is in balance with a combined cutting force R (vector) that acts from the tool 23 to the workpiece 5. Therefore, the following equation holds.

$$R = -b(h \cdot \overline{Kc} + \overline{Fe}) \quad \text{[Equation 1]}$$

FIG. 2E also shows, similarly to the case of FIG. 2D, the workpiece 5 extracted from FIG. 2C. Herein, three following states are considered. At first, in a first state (first moment), the tip of the blade of the tool 23 is cutting the workpiece 5, and a crack inherent in the workpiece 5 from the beginning exists at the edge of the tip of the blade (when no single crack growth is tolerated, a largest crack is assumed in a most dangerous direction). It is assumed that the combined cutting force from the tool 23 to the workpiece 5 is R (vector) and the elastic strain energy inside the workpiece 5 is $U_1$. Herein, it is considered that the cutting motion is suddenly stopped from the first state and the combined cutting force R (vector) applied between the tool 23 and the workpiece 5 is reduced until it becomes zero (unloaded). At that time, the tip of the blade of the tool 23 is in contact with the surface of the workpiece 5 while no force is acting. This is referred to as a zeroth state and a relative position of the tool 23 with respect to the workpiece 5 at that time is referred to as an origin, for convenience. When a force is applied, again from this zeroth state, between the tool 23 and the workpiece 5 in a direction of the combined cutting force R (vector), and when this force is increased until the magnitude thereof becomes R, the relative position moves from the origin to a position λ1 (vector) and the state returns to the state 1. During this time, the force increases in proportion to the traveled distance. Therefore, the elastic strain energy $U_1$ in the first state can be calculated by the following equation.

$$U_1 = \tfrac{1}{2} \overline{R} \cdot \overline{\lambda_1} \qquad \text{[Equation 2]}$$

Next, it is assumed that, in the first state (first moment), a small crack growth has occurred by keeping the same combined cutting force R (vector). This state will be referred to as a second state. As this crack grows, a relative position vector of the tool 23 with respect to the workpiece 5 moves from the position $\lambda_1$ (vector) to a position $\lambda_2$ (vector) by a small displacement $\Delta\lambda$ (vector). Therefore, a strain energy $U_2$ in the second state can be calculated, similarly to the case of the first state, by the following equation.

$$U_2 = \tfrac{1}{2} \overline{R} \cdot \overline{\lambda_2} \qquad \text{[Equation 3]}$$

At that time, as the elastic strain energy changes from $U_1$ to $U_2$ while the combined cutting force R (vector) performs a work of R (vector)·Δλ (vector), a released mount ΔU of the elastic strain energy can be calculated by the following equation.

$$\Delta U = \overline{R} \cdot \Delta\overline{\lambda} - (U_2 - U_1) = \tfrac{1}{2} \overline{R} \cdot \Delta\overline{\lambda} \qquad \text{[Equation 4]}$$

(Definition of a second energy amount) A surface energy of a new surface that is generated by the assumed small crack growth is referred to as a crack growth energy or simply a second energy amount. When the above-mentioned first energy amount becomes larger than this second energy amount, the crack may grow by consuming the energy of the elastic deformation. In other words, it is predicted that an undesired defect occurs when the released amount of the elastic strain energy becomes larger than this crack growth energy (Griffith's condition).

This second energy amount can be directly quantified by an assumption of a crack growth amount. That is, this second energy amount is a surface energy of a new surface that is generated in the workpiece 5 by an assumed crack growth. Therefore, the second energy amount can be calculated by multiplying a surface energy per unit area that the workpiece 5 has by a surface area of an assumed crack growth. In other words, the crack growth energy or the second energy amount can be also calculated by a calculation procedure, a computer simulation or the like to which parameters related to the workpiece 5 are inputted.

It should be noted that when a brittle fracture occurs in a common brittle material, a plastic deformation also may occur therewith. In this case, the surface energy per unit area in the definition of the second energy amount may be replaced with an effective surface energy per unit area. Herein, the effective surface energy per unit area is a sum of a surface energy per unit area and a plastic strain energy per unit area. In this case, when a decremental of a strain energy due to an assumed crack growth exceeds an incremental of an effective surface energy due to the crack growth, this crack growth occurs (Griffith-Orowan-Irwin's condition).

In the present embodiment, by respectively calculating the first energy amount and the second energy amount based on parameters related to the tool 23 and the workpiece 5 and comparing them, an occurrence of defect can be predicted before starting an actual cutting process and consider changing parameters so that no defect occurs.

Figure 3:
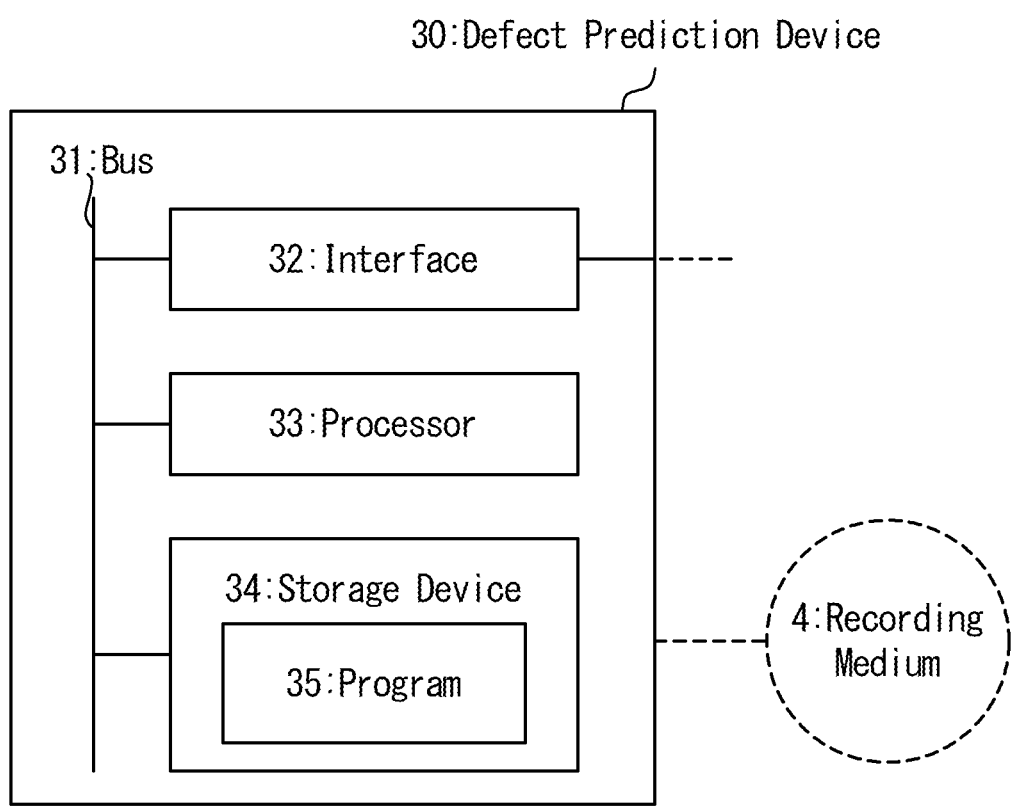
FIG. 3 is a block circuit diagram that shows a configuration example of a defect prediction device according to an embodiment.

A configuration example of a defect prediction device 30 in FIG. 3 will be described. FIG. 3 is a block circuit diagram that shows a configuration example of a defect prediction device 30 according to an embodiment. The defect prediction device 30 according to the present embodiment is provided with a bus 31, an interface 32, a processor 33 and a storage device 34. The bus 31 is electrically connects to each of the interface 32, the processor 33 and the storage device 34 and is configured so that the interface 32, the processor 33 and the storage device 34 can communicate to each other. The interface 32 is electrically connected to the interface 300 of the control device 3 and the interface circuit 241 of the processing apparatus 2 and performs communication between the defect prediction device 30, the control device 3 and the processing apparatus 2. The interface 32 may be communicably connected to further other input/output devices. The further other input/output devices may include, for example, an output device such as a display device or a printer and an input device such as a keyboard or a mouse, and the like. The processor 33 is configured to read out a program 35 stored in the storage device 34 to execute and perform operations specified in this program. The storage device 34 is configured to readablely store a program 35 that the processor 33 executes. The storage device 34 may be configured to further store an operation result by the processor 33. The program 35 may be read out from a recording medium 4 to be stored in the storage device 34.

Figure 4:
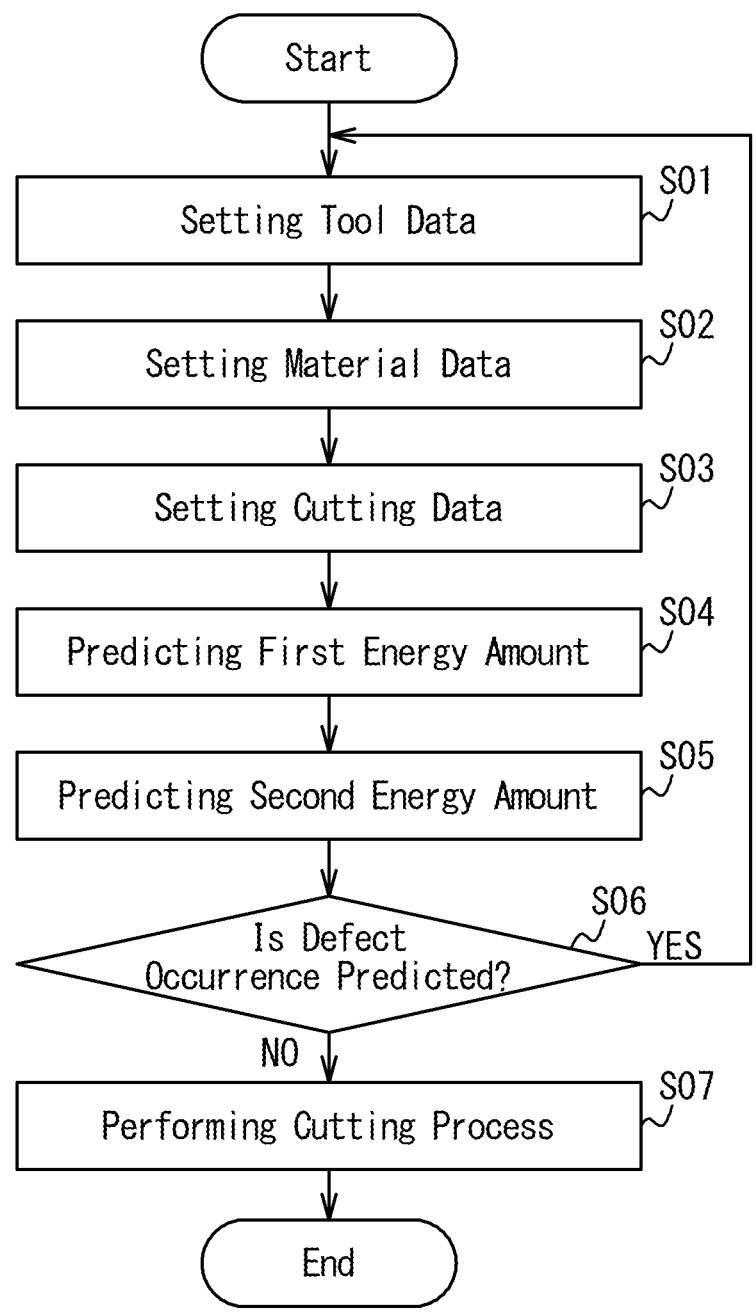
FIG. 4 is a flowchart that shows a configuration example of a low toughness workpiece manufacturing method according to an embodiment.

An operation of the low toughness workpiece cutting apparatus 1 according the present embodiment, that is, the low toughness workpiece manufacturing method and the low toughness workpiece manufacturing program according to the present embodiment will be described. FIG. 4 is a flowchart that shows a configuration example of a low toughness workpiece manufacturing method and a low toughness workpiece manufacturing program according to an embodiment.

The flowchart in FIG. 4 will be described. The flowchart in FIG. 4 includes a total of seven steps consisting of a first step S01 to a seventh step S07. When the flowchart in FIG. 4 starts, the first step S01 is executed.

In the step S01, tool data are set to the defect prediction device 30. Information related to the tool data is stored in the storage device 34, and by reading this information from the storage device 34, the processor 33 becomes able to apply the tool data when the processor 33 performs a prediction of the first energy amount described later.

The tool data will be described. The tool data includes tool physical characteristics data that represent physical characteristics of a material constituting the tool 23, tool shape data that define a shape of the tool 23, and the like. As an example, when the tool 23 is an end mill with an approximately cylindrical shape, the shape of the tool 23 is defined by a diameter of a blade part of the end mill, a length in the rotation axis direction of the blade part, a blade number, a blade helix angle, a cutting-edge angle, a rake angle, a clearance angle, and the like. However, the tool data are not limited to those examples. Next to the first step S01, a second step S02 will be executed.

In the step S02, material data are set to the defect prediction device 30. Similarly to the case of the tool data in the first step S01, information of the material data is also stored in the storage device 34, and by reading from this information from the storage device 34, the processor 33 sets the material data to the defect prediction device 30.

The material data will be described. The material data includes material physical characteristics data that represent physical characteristics of a material constituting the workpiece 5, material shape data that defines a shape of the workpiece 5, and the like.

The material physical characteristics data will be described. As an example, the workpiece 5 is entirely or partially constituted of a low toughness material. A low toughness material has a low toughness and fragility, and an undesired part thereof may be defected during a cutting process, depending on a cutting method. In this sense, a process of cutting a workpiece 5 constituted of a low toughness material is very difficult. Therefore, in the present embodiment, from a perspective of fracture mechanics, it is assumed that initial defects exist at random inside the workpiece 5. That is, it is assumed that a plurality of initial defects defined with various sizes and various directions exist inside the workpiece 5 with a predetermined probability distribution. It will be considered about a case in which an initial defect among the plurality of initial defects defined as above, of which a condition that is the worst from a perspective of suppressing an occurrence of defect, exists in a region of the workpiece 5 where the cutting force 7 by the tool 23 acts. Herein, the initial defect with a worst condition may be for example an initial defect with a largest scale among all assumed initial defects, an initial defect pointing in a direction closest to a direction in which a crack growth is likely occur due to the cutting force 7 or an initial defect of which a result of performing a predetermined weighting operation on a size of the scale and a proximity of direction becomes maximal. If no crack growth due to the cutting force 7 occurs in the region where the initial defect with a worst condition exists, that is, if no defect occurs, it can be predicted that no defect due to the same cutting force 7 occurs in regions where other initial defects exist.

It is preferable that parameters representing physical characteristics of a low toughness material include, for example, at least a part of a specific cutting resistance, an edge force, a shear strength, a coefficient of friction between the tool 23 and the chip 8, a density, a Young's modulus, a Poisson's ratio and the like that are related to the calculation of the cutting force 7. In addition, it is preferable that the parameters representing physical characteristics of a low toughness material specifically includes, in addition to the above parameters, a bulk modulus, a shear modulus of elasticity, fracture toughness value $K_{1C}$ and the like of the low toughness material constituting the workpiece 5 that are related to crack growth.

Material shape data will be described. The cutting force 7 applied from the tool 23 to the workpiece 5 may change depending on the shape of the workpiece 5. It is preferable that the shape of the workpiece 5 at each timing can be grasped as needed because the shape of the workpiece 5 carries on changing as the cutting process progresses. As an example, information that is set as material shape includes information that represents a shape of the workpiece 5 before starting the cutting and a position of the workpiece 5 with respect to the table 22. The information that is set as the material shape may further include, when a process including cutting is executed in accordance with a control signal based on cutting data, information that represent a shape during the cutting of the workpiece 5 of which the shape carries on changing from immediately before the start of this process to immediately after the end of this process.

In a third step S03, the cutting data is set to the defect prediction device 30. Information related to a setting of the cutting data is also stored in the storage device 34. By reading this information from the storage device 34, the processor 33 sets the cutting data to the defect prediction device 30.

The cutting data will be described. The cutting data includes a group of parameters used by the control device 3 to control the processing apparatus 2. As a more detailed specific example, the cutting data includes information defining a plurality of processes specified by a plurality of parameters including a timing, a direction, a speed, a distance and the like by which the table 22 and the tool 23 of the processing apparatus 2 is moved under a control of the control device 3, and information that specifies a timing, an order and the like of executing the plurality of processes. The cutting data includes information to define a cutting path. A cutting path is a path where the tool 23 relatively moves with respect to the workpiece 5 by cutting the workpiece 5. However, the content of the cutting data is not limited to these examples.

It should be noted that each of the first step S01 to the third step S03 may be executed independently, therefore the order of execution may be changed, and some or all of them may be executed in parallel. When all of the first step S01 to the third step S03 are completed, a fourth step S04 is executed next.

In the fourth step S04, the processor 33 executes a first energy amount prediction program to calculate the first energy amount based on the cutting force 7 applied from the tool 23 to the workpiece 5. More specifically, by predicting a state of the cutting process to the workpiece 5 by the tool 23 by a computer simulation based on the tool data, the material data and the cutting data that are set in the first step S01 to the third step S03, the cutting force 7 which is predicted that the tool 23 applies to the workpiece 5 is calculated. The cutting force 7 can be calculated similarly to the case of the above-described combined cutting force R, for example. Then, based on the predicted cutting force 7, a decremental of the strain energy of the workpiece 5 is calculated, that is, the first energy amount is calculated. The first energy amount can be calculated similarly to the case of the above-described released amount AU of the elastic strain energy, for example.

In a fifth step S05, a second energy amount prediction program is executed to calculate the second energy amount. More specifically, by predicting a surface energy of a new surface of the workpiece 5, that is generated by an assumed crack growth, by a computer simulation based on the material physical characteristics value that is set in the second step S02, the second energy amount, that is predicted to be necessary, when a crack exists in the workpiece 5, for this crack to grow, is calculated.

It should be noted that each of the fourth step S04 and the fifth step S05 may be independently executed, therefore the order of execution may be changed, and some or all of them may be executed in parallel. When the fourth step S04 and the fifth step S05 are completed, a sixth step S06 is executed.

In the sixth step S06, a prediction of an occurrence of defect and/or a non-occurrence of defect is performed. More specifically, the first energy amount calculated in the fourth step S04 and the second energy amount calculated in the fifth step S05 are compared. As a result, if the first energy amount is equal to or greater than the second energy amount, the defect prediction device 30 predicts an occurrence of defect because a prediction holds in that a defect due to the cutting process occurs in the workpiece 5. In other words, if the first energy amount is less than the second energy amount, the defect prediction device 30 predicts a non-occurrence of defect because a prediction holds in that no defect due to the cutting process occurs in the workpiece 5.

When it is predicted that a defect occurs (YES), the first step S01 to the sixth step S06 will be executed again after the sixth step S06. At that time, a modification processing section 334 described later reviews and modifies one or more parameters among the tool data, the material data and the cutting data. A review of parameters may be automatically performed by the modification processing section 334 by executing a predetermined program, may be automatically performed by the modification processing section 334 by using an Artificial Intelligence (AI), or may be manually performed by a user, for example. In any case, it is preferable that the modification processing section 334 stores a result of reviewing parameters in the storage device 34. As an example, an upper limit value and a lower limit value that are available for each parameter to be modified may be preliminary stored in the storage device 34, and each parameter may be automatically incremented or decremented within a corresponding range or each parameter may be automatically selected at random from the corresponding range, by a predetermined program. In addition, as another example, an order of priority to review the plurality of parameters may be preliminary stored in the storage device 34 and the parameters may be reviewed in the order of priority while other parameters are fixed, or a plurality of parameters may be reviewed at a same time. As a further other example, a result of machine learning performed about a relationship between a combination of the plurality of parameters and/or a combination of modifications of the plurality of parameters and an occurrence or non-occurrence of defect may be preliminarily stored in the storage device 34 and an inference engine realized by the modification processing section 334 may search for a combination of parameters with which a non-occurrence of defect is expected. On the contrary, when it is predicted that no defect occurs (NO), a seventh step S07 will be executed after the sixth step S06.

In the seventh step S07, the process including the cutting is performed by use of the combination of parameters with which it is predicted that no defect occurs. More specifically, a non-illustrated processor of the control device 3 executes a predetermined program to generate a desired control signal, and the processing apparatus 2 cuts the workpiece 5 without occurrence of defect by processing the workpiece 5 according to this control signal. When the seventh step S07 ends, the flowchart in FIG. 4 also ends.

Figure 5:
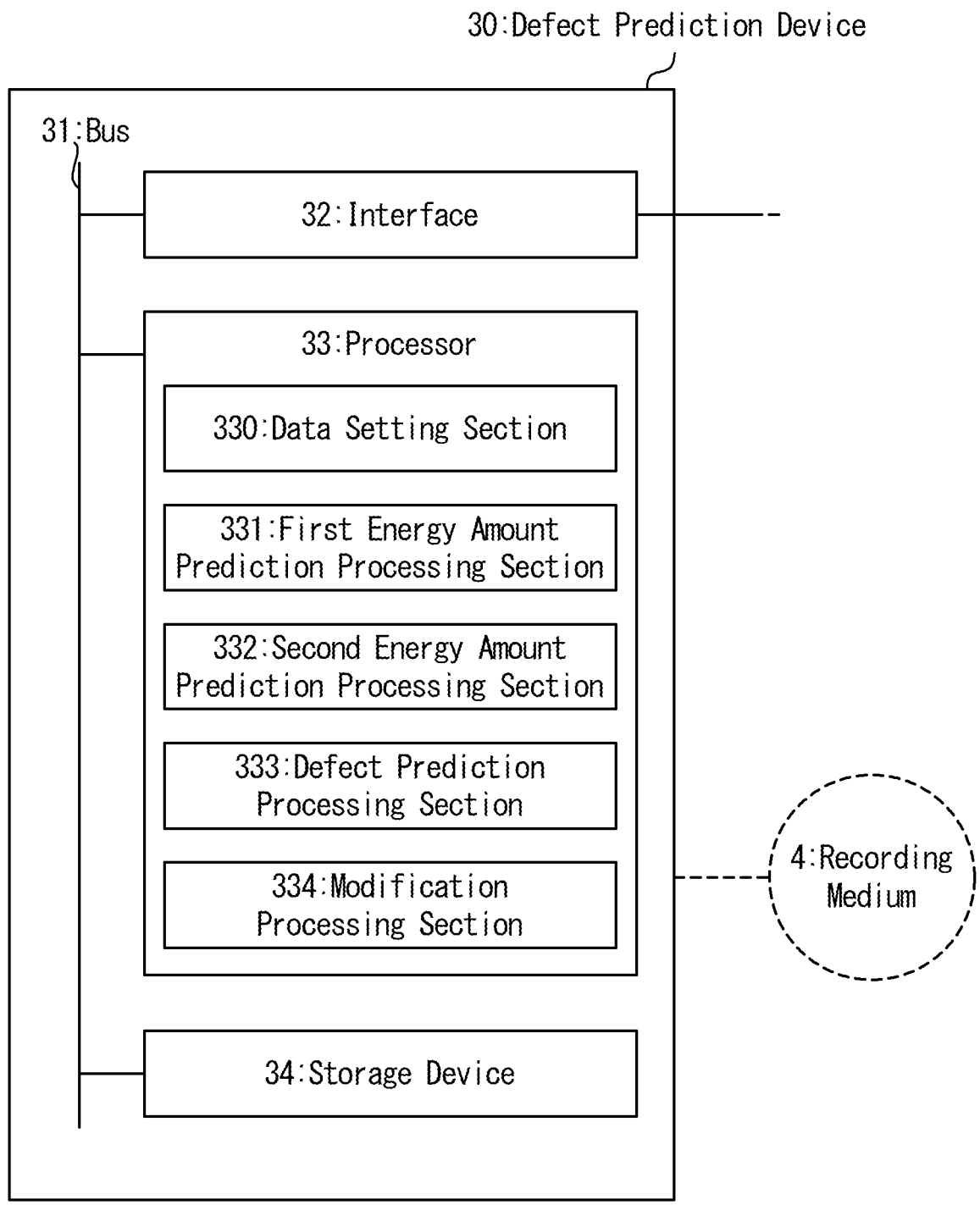
FIG. 5 is a block circuit diagram that shows a configuration example of the defect prediction device in FIG. 3 from a perspective of functional blocks.

A configuration example of the defect prediction device 30 in FIG. 3 will be described from a perspective of the steps included in the flowchart in FIG. 4. FIG. 5 is a block circuit diagram that shows a configuration example of the defect prediction device 30 in FIG. 3 from a perspective of functional blocks. As shown in FIG. 3, the defect prediction device 30 in FIG. 5 is provided with the bus 31, the interface 32, the processor 33 and the storage device 34. The defect prediction device 30 in FIG. 5 is provided with a data setting section 330, a first energy amount prediction processing section 331, a second energy amount prediction processing section 332, a defect prediction processing section 333 and a modification processing section 334. The data setting section 330 is a virtual functional block that executes the first step S01 to the third step S03 of the flowchart in FIG. 4. The first energy amount prediction processing section 331 is a virtual functional block that executes the fourth step S04 of the flowchart in FIG. 4. The second energy amount prediction processing section 332 is a virtual functional block that executes the fifth step S05 of the flowchart in FIG. 4. The defect prediction processing section 333 is a virtual functional block that executes the sixth step S06 of the flowchart in FIG. 4. The modification processing section 334 is a virtual functional block that executes a part of the sixth step S06 of the flowchart in FIG. 4. As other components shown in FIG. 5 are similar to the components shown in FIG. 3, further detailed description thereof is omitted.

It should be noted that while a case in which the processing apparatus 2 is a knee-type CNC milling machine is herein described, the present embodiment is not limited to this example and may be applied to any process including cutting.

According to the present embodiment, it can be predicted whether a defect occurs in a cutting process of a low toughness material by a computer simulation based on cutting data, tool data and material data before performing the cutting process. In addition, when it is predicted that a defect occurs due to the cutting process, each of parameters related to the cutting process can be reviewed until it is predicted that no defect occurs. That is, parameters with which it is predicted that no defect occurs can be outputted as a prediction result before performing the cutting process, and by performing the cutting process by use of this condition, the cutting process can be performed by preliminarily suppressing an occurrence of defect. In addition, a plurality of groups of parameters with which it is predicted that no defect occurs can be displayed on the defect prediction device 30 and select a condition for setting a higher processing efficiency of the cutting process. Alternatively, the defect prediction device 30 can be made to display a condition for setting a higher cutting efficiency. As a result, an improvement of yield in cutting process of low toughness material is expected while satisfying a high cutting efficiency.

(Second embodiment) In the present embodiment also it is predicted whether an undesired defect occurs when performing a cutting process to a low toughness material under a predetermined cutting condition in which parameters related to the tool data, the cutting data and the material data are combined, by a computer simulation before performing this cutting process. However, in the present embodiment, this prediction is performed based on a criterion in that an undesired defect may occur in the low toughness material when a stress intensity factor K becomes larger than a fracture toughness value $K_{1C}$. This criterion means in other words that no defect occurs as long as the stress intensity factor K is smaller than the fracture toughness value $K_{1C}$. Herein, a determination in the present embodiment about an occurrence of defect based on a result of comparison between the stress intensity factor K and the fracture toughness value $K_{1C}$ is essentially the same as the determination in the first embodiment about an occurrence of defect based on a result of comparison between the first energy amount and the second energy amount, while methods of calculations performed therefor are different. It should be noted that in the present embodiment a process efficiency of the cutting under this cutting condition can be predicted furthermore.

As the low toughness workpiece cutting apparatus 1 used in the present embodiment is of a same configuration as the one used in the first embodiment, further detailed description thereof will be omitted. Similarly, as the processing apparatus 2 and the control device 3 used in the present embodiment are also of same configurations as the ones used in the first embodiment, further detailed descriptions thereof will be omitted.

The stress intensity factor K will be described. The stress intensity factor K is a physical quantity used in a field of fracture mechanics and the like to evaluate a strength of a material in which a crack or a defect exists, and represents a strength of a stress distribution in a proximity of a tip of a crack or a defect. The stress intensity factor K is calculated based on a plurality of parameters included in a cutting condition of a process performed by the processing apparatus 2 to the workpiece 5 under a control of the control device 3. The plurality of parameters includes a type of material constituting the tool 23, a clearance angle of a blade of the tool 23, a relative feed amount of the tool 23 with respect to the workpiece 5, a depth of cut, a path angle, a lead angle and the like.

Figure 6A:
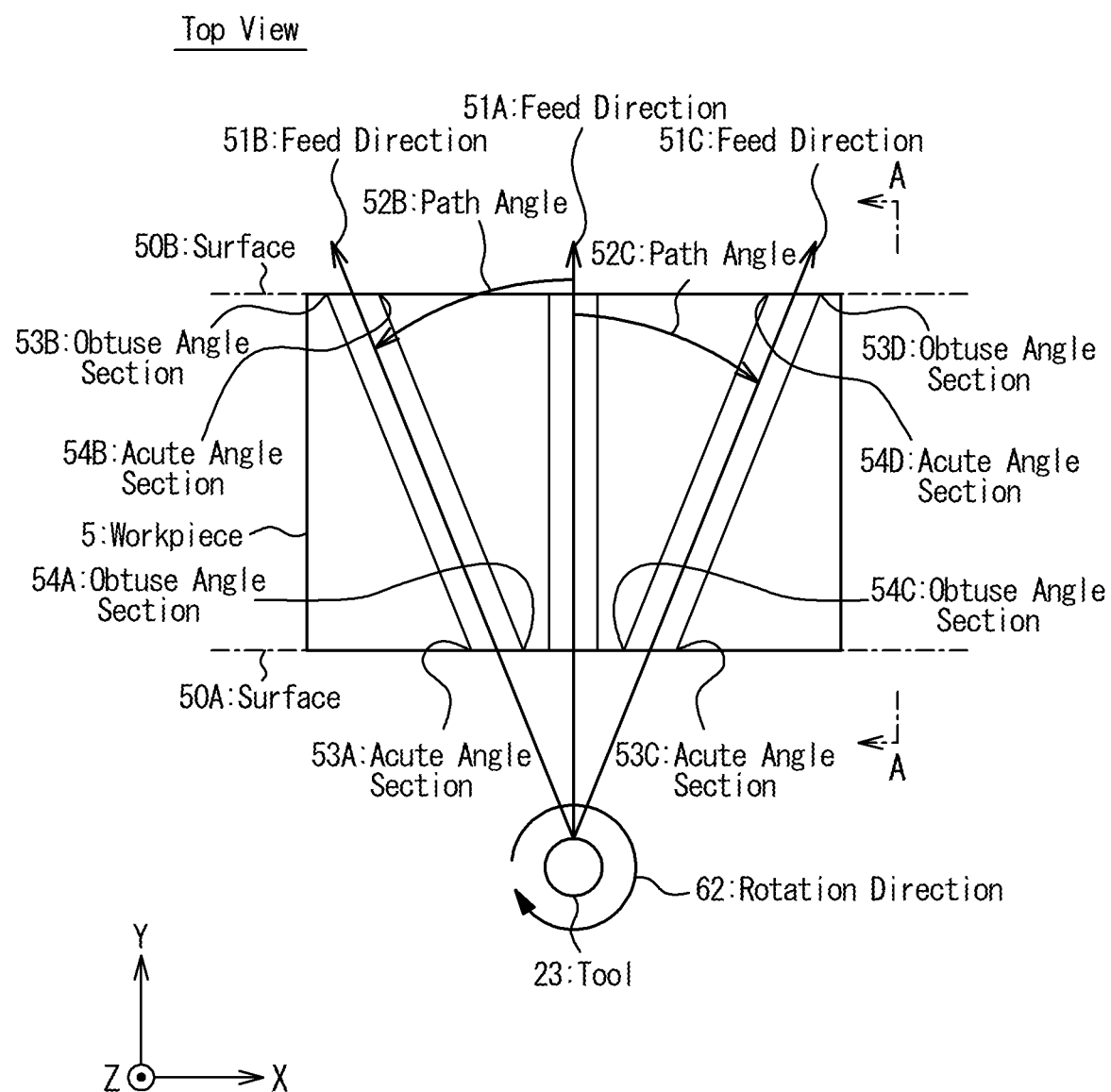
FIG. 6A is a top view that shows an example of a group of parameters included in cutting data in a low toughness workpiece manufacturing method according to an embodiment.

The path angle of the tool 23 will be described. FIG. 6A is a top view that shows an example of a group of parameters included in cutting data in a low toughness workpiece manufacturing method according to an embodiment. In the example of FIG. 6A, the workpiece 5 has a rectangular parallelepiped shape and is disposed so that each side thereof is parallel to any one of X axis, Y axis or Z axis of a cartesian coordinate. Herein, the Z axis is parallel to a vertical direction for example and the rotation axis 61 of the tool 23 is approximately parallel to the Z axis. In addition, the Y axis is orthogonal to the Z axis and is parallel to a feed direction 51A of the tool 23 as a reference, as described later. The X axis is orthogonal to both the Y axis and the Z axis. The lead angle between the rotation axis 61 of the tool 23 and the Z axis will be described later.

In the example of FIG. 6A, three feed directions 51A to 51C are shown as relative directions in which the tool 23 moves with respect to the workpiece 5. The first feed direction 51A is parallel to the Y axis. In other words, a surface 50A, where the tool 23 comes in contact with the workpiece 5 at first when the tool 23 relatively moves with respect to the workpiece 5 along the feed direction 51A and the cutting starts, is perpendicular to the feed direction 51A. In addition, a surface 50B, where the tool 23 finally separates from the workpiece 5 when the tool 23 relatively moves with respect to the workpiece 5 along the feed direction 51A and the cutting ends, is also perpendicular to the feed direction 51A. Herein, the path angle is defined with respect to this feed direction 51A as a reference. In other words, a path angle of the feed direction 51A is zero degree.

In the example of FIG. 6A, the second feed direction 51B is separated from the first feed direction 51A by an angle 52B in an anti-clockwise direction when viewed from the tool 23. This angle 52B is referred to as a path angle 52B corresponding to the feed direction 51B. On the contrary, the third feed direction 51C is separated from the first feed direction 51A by an angle 52C in a clockwise direction. This angle 52C is referred to as a path angle 52C corresponding to the feed direction 51C. Hereinafter, when the feed directions 51A to 51C are not distinguished, they may be simply referred to as a feed direction 51. Similarly, when the path angles 52B and 52C are not distinguished, they may be simply referred to as a path angle 52.

The stress intensity factor K depends to a shape around a part of the workpiece 5 where the blade of the tool 23 comes in contact, a direction of a force applied from the tool 23 to the workpiece 5 at this part, and the like. It will be considered about a case in which the tool 23 moves, in the example of FIG. 6A, when the tool 23 which rotates in a rotation direction 62 in a clockwise rotation direction when viewed from the +Z direction cuts the workpiece 5, along any feed direction 51 when viewed from the workpiece 5, so as to enter by the surface 50A and leave from the surface 50B. When the tool 23, that was until then separated from the workpiece 5, moves by rotating along a feed direction 51 and a blade of the tool 23 enters in the surface 50A of the workpiece 5, a defect is more likely to occur if an angle between the surface 50A and the feed direction 51 is an acute angle (for example, acute angle section 53A), and conversely, a defect is less likely to occur if this angle is obtuse (for example, obtuse angle section 54C). Similarly, when the tool 23, that was until then cutting the workpiece 5, moves by rotating along a feed direction 51 and leaves from the surface 50B of the workpiece 5 and the blade of the tool 23 finally contacts the surface 50B from outside the workpiece 5, a defect is more likely to occur if an angle between the surface 50B and the feed direction 51 is an acute angle (for example, acute angle section 54B), and conversely, a defect is less likely to occur at a part where this angle is an obtuse angle (for example, obtuse angle section 53D). Similarly, when the tool 23, that was until then cutting the workpiece 5, moves by rotating and contacts the surface 50A or the surface 50B from inside the workpiece 5, a defect is more likely to occur if an angle between the surface 50A or the surface 50B and the feed direction 51 is an acute angle (for example, acute angle sections 53C and 54D) and conversely, a defect is less likely to occur if this angle is an obtuse angle (for example, obtuse angle sections 54A and 53B). Those angles vary depending on a path angle 52 corresponding to the feed direction 51 or the like. In addition, if other parameters are the same, a cutting force 7 in an acute angle section 53C in a direction in which a blade of the tool 23 pulls the acute angle section 53C is more likely to make a defect occur than a cutting force 7 in an acute angle section 53A in a direction in which a blade of the tool 23 pushes the acute angle section 53A.

Figure 6B:
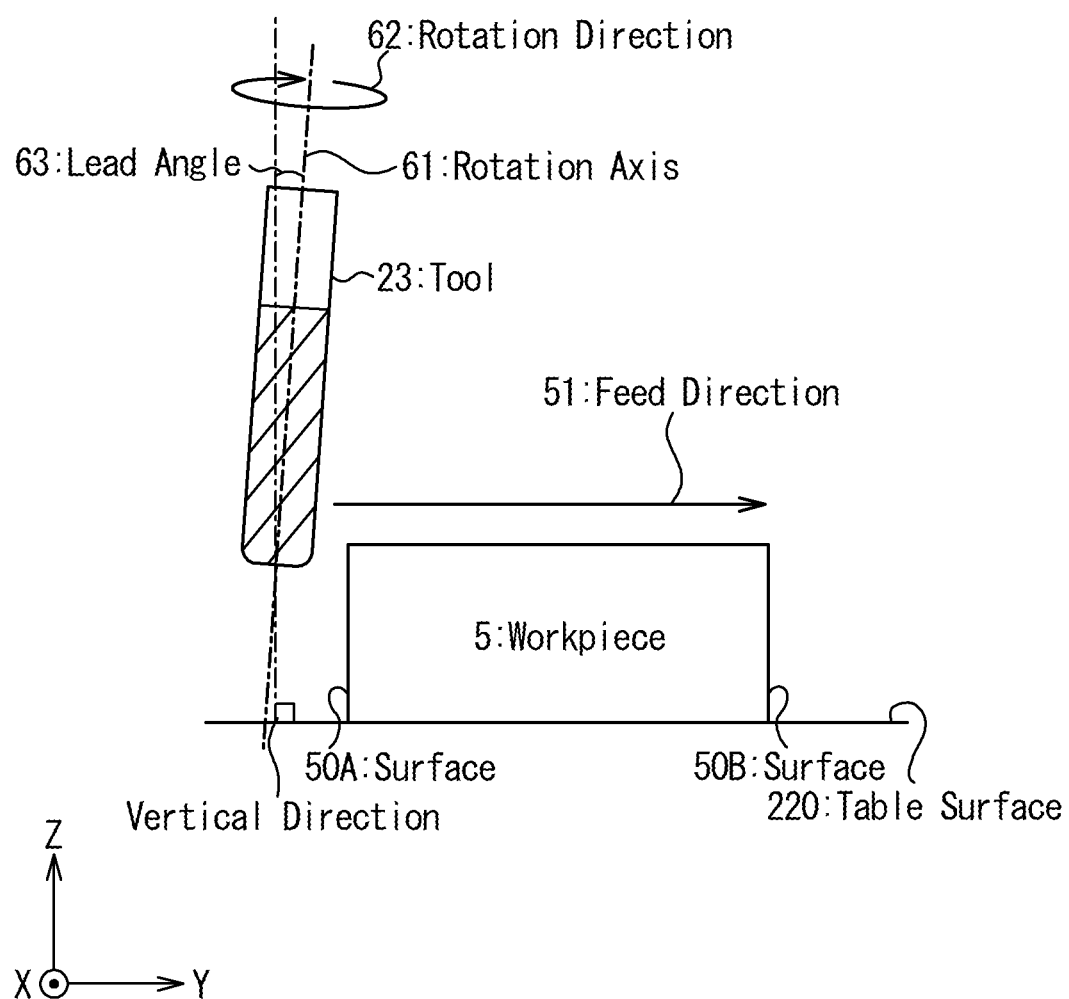
FIG. 6B is a side view that shows an example of a group of parameters included in cutting data in a low toughness workpiece manufacturing method according to an embodiment.

The lead angle of the tool 23 will be described. FIG. 6B is a side view that shows an example of a parameters included in cutting data in a low toughness workpiece manufacturing method according to an embodiment. In the example of FIG. 6B, the rotation axis 61 of the tool 23 is tilted by a predetermined angle with respect to a surface perpendicular to the feed direction 51. This angle is referred to as the lead angle 63. In addition, although it is not illustrated, an angle by which the rotation axis 61 is tilted with respect to a direction perpendicular to a pick feed direction in a plan perpendicular to the feed direction 51 is referred to as a tilt angle. By changing this lead angle and this tilt angle, a cutting thickness at a blade tip section and an angle between an end surface and the processed surface (a surface including the blade tip and the cutting direction) of the workpiece 5 slightly change when the cutting ends. For this reason, the lead angle 63 and the tilt angle are also parameters of the cutting condition that modify the stress intensity factor K.

It should be noted that a helix angle of a blade of an end mill, that is, an angle between a ridge of the blade and the rotation axis 61, may be referred to as "lead angle" and therefore distinction should be noted. It should be noted that a curve drawn by an end of a blade of an end mill during a cutting process is for example a trochoid curve when the lead angle (the lead angle shown in FIG. 6B) 63 is zero degree and may be an intermediate curve between a trochoidal curve and a spiral when the lead angle 63 is an angle other than zero degree.

A comparison between the stress intensity factor K calculated from each parameter of the cutting process and the fracture toughness value $K_{1C}$ of the low toughness material constituting the workpiece 5 will be described. Herein, to make the description easier, it will be described about calculating the stress intensity factor K in each of cases in which only the path angle and the feed amount, among the parameters related to the stress intensity factor K, are modified. However, in reality, to calculate the stress intensity factor K of each different cutting condition, two other parameters included in the cutting condition may be modified, or more than two parameters may be modified.

Figure 7:
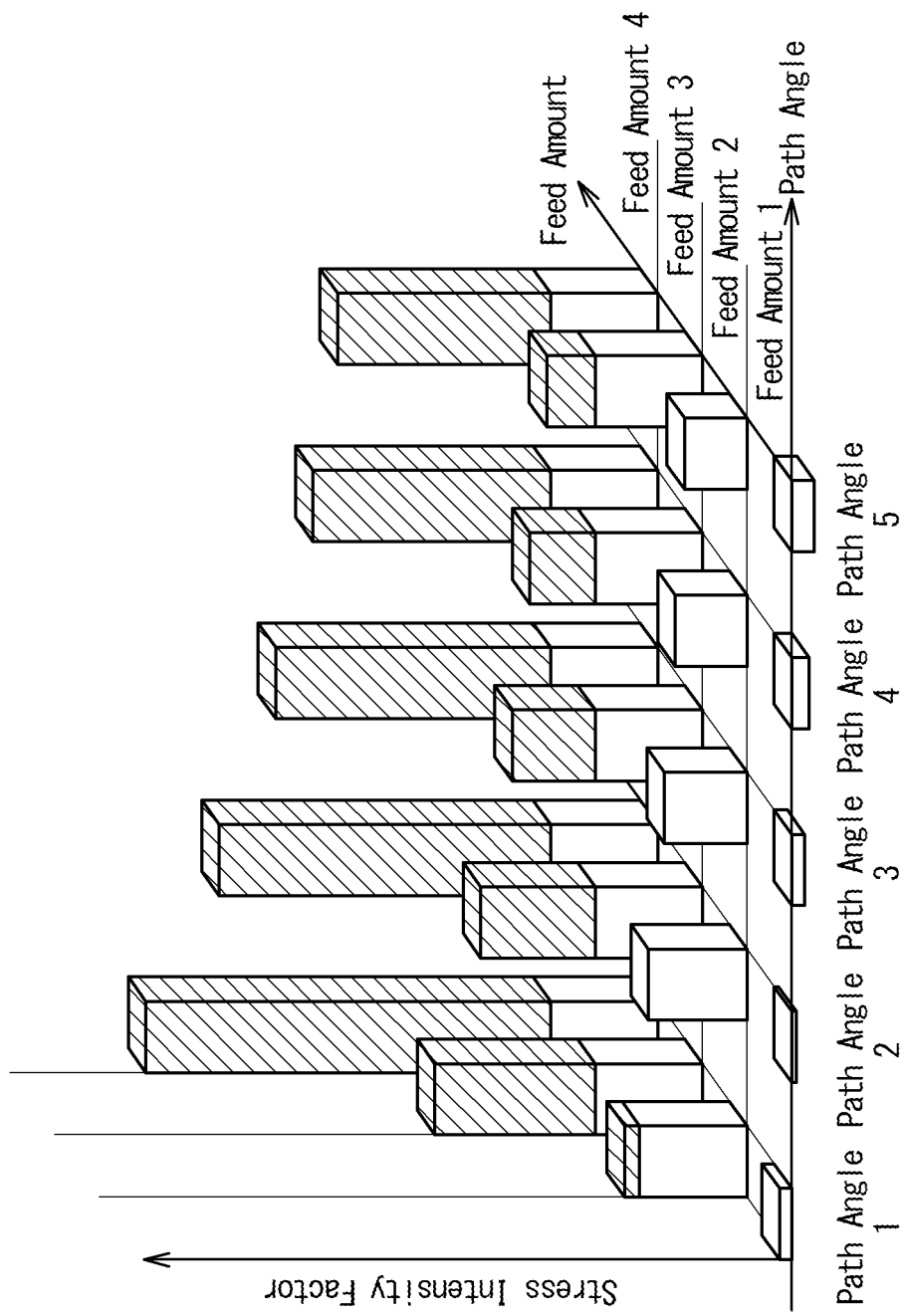
FIG. 7 is a perspective bar graph that shows an example of stress intensity factor corresponding to a combination of a path angle and a feed amount.

FIG. 7 is a perspective bar graph that shows an example of stress intensity factor K corresponding to a combination of a path angle and a feed amount. In FIG. 7, a total of twenty bar graphs arranged in five rows and four columns are drawn. Those bar graphs represent by heights thereof twenty kinds of values of stress intensity factor K that are expected to be respectively generated by combining five kind of path angles and four kinds of feed amounts, respectively.

Values of the path angle 1 to the path angle 5 are indicated on the coordinate axis of the path angles. In the path angle 1 to the path angle 5, the larger the attached number is, the larger the corresponding path angle is, not necessarily proportional to the attached number. It is similarly in the feed amount 1 to the feed amount 4 indicated on the coordinate axis of the feed amount.

Some of the bar graphs of twenty bar graphs shown in FIG. 7 are painted in two colors. The bar graphs painted in two colors are a total of eleven bar graphs including ten bar graphs of which the feed amount is the feed amount 3 or the feed amount 4 and a bar graph of which the feed amount is equal to the feed amount 2 and the path angle is equal to the path angle 1. In all of eleven bar graphs that are painted separately, the boundary of two colors corresponds to a same value of the stress intensity factor K. This value is equal to a threshold value of a condition for the low toughness material to defect. In other words, those eleven bar graphs show that the stress intensity factor K represented by the length thereof is larger than the fracture toughness value $K_{1C}$. On the contrary, the remaining nine bar graphs show that the stress intensity factor K represented by the length thereof is smaller than the fracture toughness value $K_{1C}$.

In the present embodiment, a combination of a plurality of parameters is selected as a candidate of the cutting condition within a range in which the corresponding stress intensity factor K is less than the fracture toughness value $K_{1C}$. Furthermore, in the present embodiment, it is preferable to select a combination with a highest processing efficiency among the candidates as the cutting condition. As an example of criterion to select a combination with a highest cutting efficiency, it can be considered at first to select a cutting condition that requires a time as short as possible for processing. In the example of FIG. 7, among the feed amounts 1 to 4, feed amounts 1 and 2 can be selected so that the stress intensity factor K is lower than the fracture toughness value $K_{1C}$. Herein, as a time required for processing is shorter in the case of the feed amount 2 than the case of the feed amount 1, it is preferable to select the feed amount 2 from a perspective of making the cutting efficiency higher. Next, if the time required for processing is the same, it can be considered to select a cutting condition in which a factor of safety is higher from a perspective of suppressing a defect or the like. In the example of FIG. 7, the path angles 2 to 5 can be selected among the path angles 1 to 5 so that the stress intensity factor K is lower than the fracture toughness value $K_{1C}$ after selecting the feed amount 2. Herein, the path angle at which the stress intensity factor K becomes minimal is the path angle 5. Therefore, in the example of FIG. 7, it is preferable to select a combination of the feed amount 2 and the path angle 5. However, in reality, a criterion for selecting a combination of parameters according to the present embodiment is not limited to the above example because various parameters other than the feed amount and the path angle shown in FIG. 7, such as cutting thickness and a cutting width may be included in the cutting condition.

Figure 8:
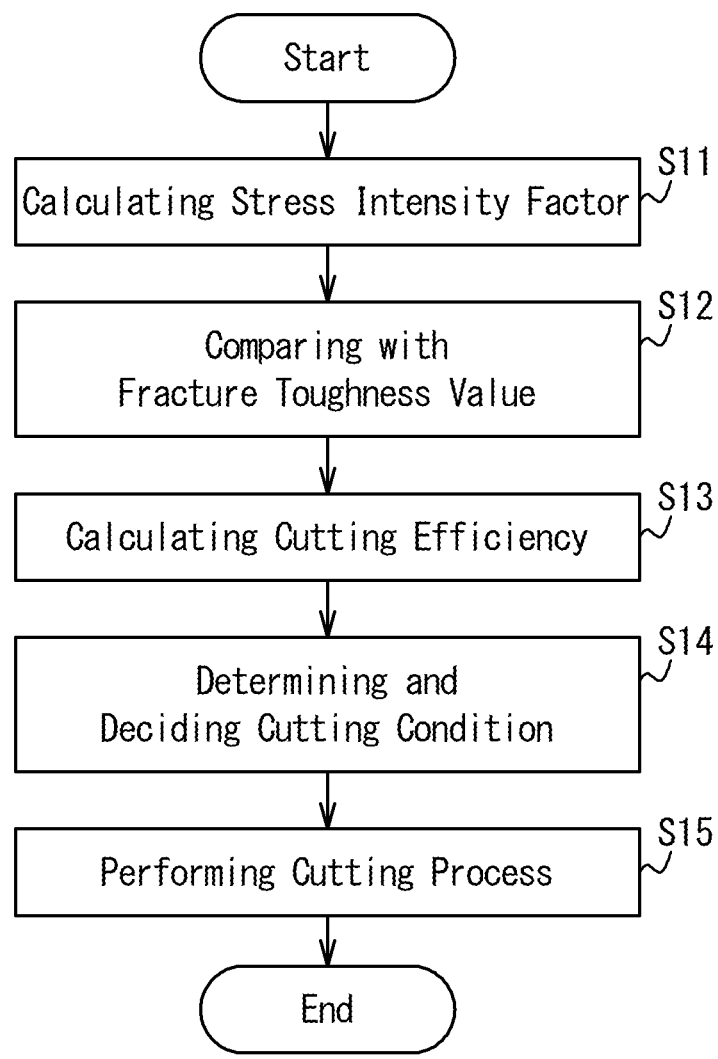
FIG. 8 is a flowchart that shows a configuration example of a low toughness workpiece manufacturing method according to an embodiment.

An operation of the low toughness workpiece cutting apparatus 1 according to the present embodiment, that is, a low toughness workpiece manufacturing method and a low toughness workpiece manufacturing program according to the present embodiment will be described. FIG. 8 is a flowchart that shows a configuration example of a low toughness workpiece manufacturing method and a low toughness workpiece manufacturing program according to an embodiment.

The flowchart in FIG. 8 will be described. The flowchart in FIG. 8 includes a total of five steps consisting of a first step S11 to a fifth step S15. When the flowchart in FIG. 8 start, the first step S11 is executed.

In the first step S11, the defect prediction device 30 calculates the stress intensity factor K based on the combination of a plurality of parameters included in the tool data, the cutting data and the material data. A second step S12 is executed after the first step S11.

In the second step S12, the defect prediction device 30 compares the fracture toughness value $K_{1C}$ and the stress intensity factor K based on a combination, that is the same as the first step S11, of the plurality of parameters included in the tool data, the cutting data and the material data. A third step S13 is executed after the second step S12.

In the third step S13, the defect prediction device 30 calculates a cutting efficiency of each of the plurality of combinations, that are same as the first step S11 and the second step S12, of the plurality of parameters included in the tool data, the cutting data and the material data. A fourth step S14 is executed after the third step S13.

It should be noted that each of the first step S11 to the third step S13 may be independently executed, therefore an order of execution may be changed, and in addition some or all of them may be executed in parallel. When all of the first step S11 to the third step S13 are completed, the fourth step S14 is executed next.

In the fourth step S14, the defect prediction device 30 determines a cutting condition for performing the cutting process, based on the result obtained in the first step S11 to the third step S13, and decides the cutting condition if a result of this determination satisfies a predetermined condition. At that time, the defect prediction device 30 selects to decide as the cutting condition a combination of which a cutting efficiency is the highest among a plurality of combinations of parameters, within a range in that the corresponding stress intensity factor K is lower than the fracture toughness value $K_{1C}$. A fifth step S15 is executed after the fourth step S14.

In the fifth step S15, a process including the cutting is performed by use of the combination of parameters with which it is predicted that no defect occurs. More specifically, a non-illustrated processor of the control device 3 generates a desired control signal by executing a predetermine program and the workpiece 5 is cut without occurrence of defect by the processing device 2 that processes the workpiece 5 according to this control signal. When the fifth step S15 ends, the flowchart in FIG. 8 ends also.

Figure 9:
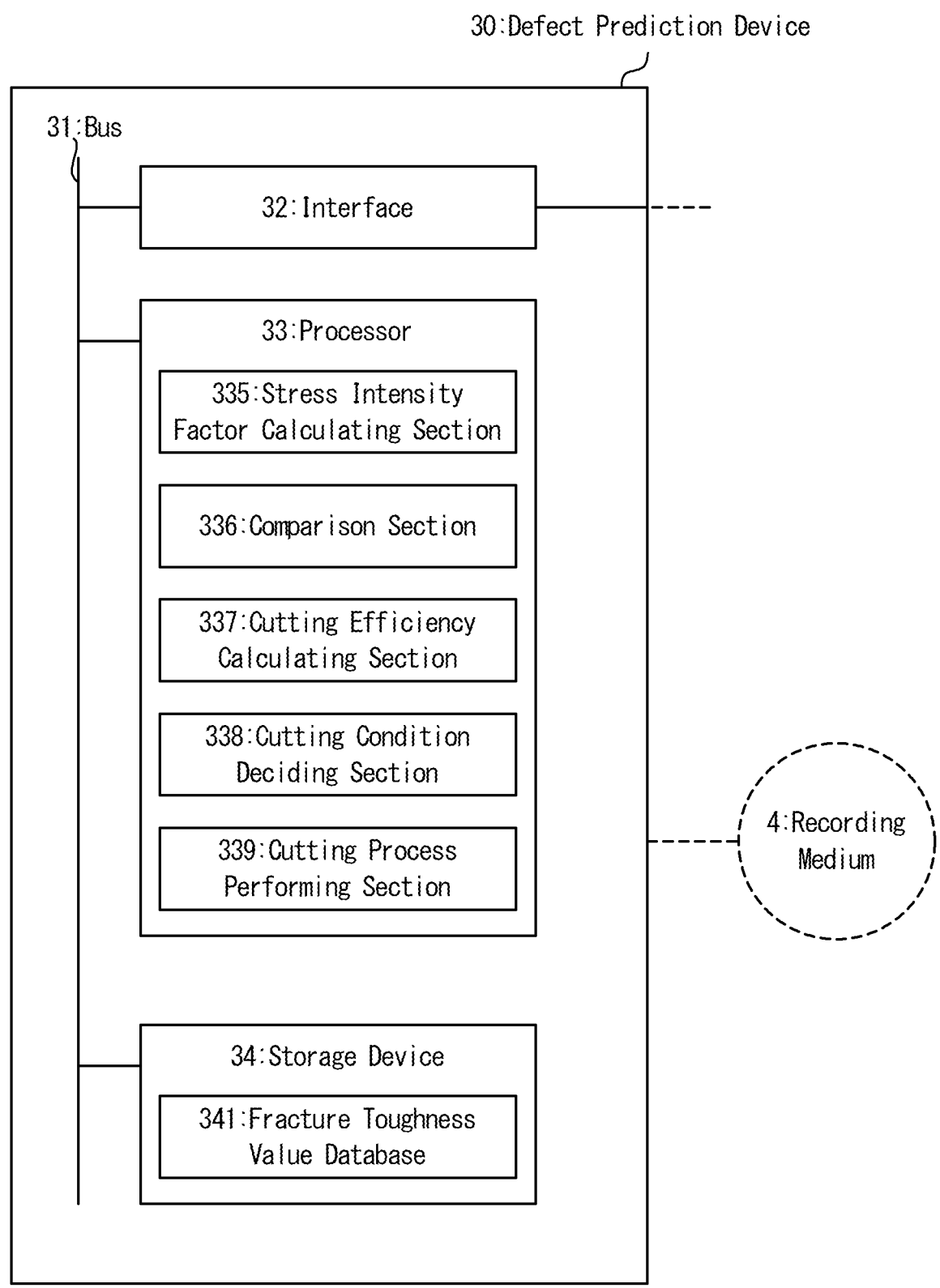
FIG. 9 is a block circuit diagram that shows a configuration example of the defect prediction device in FIG. 3 from a perspective of functional blocks.

A configuration example of the defect prediction device 30 in FIG. 3 will be described from a perspective of the steps included in the flowchart in FIG. 8. FIG. 9 is a block circuit diagram that shows a configuration example of the defect prediction device 30 in FIG. 3 from a perspective of functional blocks. The defect prediction device 30 in FIG. 9 is provided with the bus 31, the interface 32, the processor 33 and the storage device 34, as shown in FIG. 3. The defect prediction device 30 in FIG. 9 is provided with a stress intensity factor calculating section 335, a comparison section 336, a cutting efficiency calculating section 337, a cutting condition deciding section 338 and a cutting process performing section 339. The storage device 34 is provided with a fracture toughness value database 341. The fracture toughness value database 341 readably stores fracture toughness values $K_{1C}$ of low toughness materials and the like. The stress intensity factor calculation section 335 is a virtual functional block that executes the first step S11 of the flowchart in FIG. 8. The comparison section 336 is a virtual functional block that executes the second step S12 of the flowchart in FIG. 8. Herein, the comparison section 336 may read out the fracture toughness value $K_{1C}$ corresponding to the material of the workpiece 5 from the fracture toughness value database 341. The cutting efficiency calculation section 337 is a virtual functional block that executes the third step S13 of the flowchart in FIG. 8. The cutting condition deciding section 338 is a virtual functional block that executes the fourth step S14 of the flowchart in FIG. 8. The cutting process performing section 339 is a virtual functional block that executes the fifth step S15 of the flowchart in FIG. 8. As other components shown in FIG. 9 are similar to the components shown in FIG. 3, further detailed description will be omitted.

According to the present embodiment, it is expected to improve a yield and a cutting efficiency at the same time by selecting a combination of parameters so that the cutting efficiency becomes maximal or a value equivalent to the maximum within a range in which no undesired defect occurs due to the cutting process. For example, in consideration of safety to prevent an occurrence of defect, a combination with which a cutting efficiency becomes maximal within a predetermined range excluding a predetermined safety margin from a range in which the stress intensity factor K does not exceed the fracture toughness value $K_{1C}$ may be selected from combination of parameters.

While the invention by the inventors have been described in detail based on embodiments in the above, it is useless to note that the present invention is not limited to the above-described embodiments and various modified can be made without departing from the gist thereof. In addition, each feature described in the embodiments can be freely combined within a technically consistent range.

This application claims priority based on Japanese Patent Application No. 2020-42572 filed on Mar. 12, 2020 and herein incorporates whole disclosure thereof by reference.

The invention claimed is:

1. A low toughness workpiece cutting apparatus comprising a control device that comprises a defect prediction device, wherein the defect prediction device comprises:
a storage device configured to store tool data that represent physical characteristics and a shape of a tool, cutting data that represent a group of parameters of a cutting process to be performed to a workpiece by use of the tool and material data that represent physical characteristics and a shape of the workpiece;
a processor configured to perform, based on the tool data, the cutting data and the material data, an analysis of deformation of the workpiece due to a cutting force and an analysis of brittle fracture due to the deformation, and perform a prediction of an occurrence of a defect or a non-occurrence of a defect of the workpiece due to the cutting process; and
an interface configured to output a result of the prediction, wherein the control device further comprises:
a processor configured to generate, based on the result of the prediction result output by the defect prediction device, a control signal for controlling a processing apparatus that performs a processing including the cutting process by use of the tool to the workpiece; and
an interface configured to output the control signal to the processing apparatus.

2. A low toughness workpiece cutting apparatus comprising a control device that comprises a defect prediction device, wherein the defect prediction device comprises:
a storage device configured to store tool data that represent physical characteristics and a shape of a tool, cutting data that represent a group of parameters of a cutting process to be performed to a workpiece by use of the tool and material data that represent physical characteristics and a shape of the workpiece;
a processor configured to perform, based on the tool data, the cutting data and the material data, an analysis of deformation of the workpiece due to a cutting force and an analysis of brittle fracture due to the deformation, and perform a prediction of an occurrence of defect or a non-occurrence of defect of the workpiece due to the cutting process;
an interface configured to output a result of the prediction; and
the processor further execute a program to perform the function of:
a stress intensity factor calculating section configured to calculate, based on a plurality of combinations of parameters included in the tool data, the cutting data and the material data, a stress intensity factor;
a comparison section configured to compare, based on the plurality of combinations, a fracture toughness value related to a material of the workpiece and the stress intensity factor;
a cutting efficiency calculating section configured to calculate, based on the plurality of combinations, a process efficiency of the cutting process; and
a cutting condition deciding section configured to select, from the plurality of combinations, a combination with which the process efficiency becomes maximal in a predetermined range in which the stress intensity factor does not exceed the fracture toughness value to decide the selected combination as a cutting condition.

3. A low toughness workpiece cutting apparatus comprising a control device that comprises a defect prediction device, wherein the defect prediction device comprises:
a storage device configured to store tool data that represent physical characteristics and a shape of a tool, cutting data that represent a group of parameters of a cutting process to be performed to a workpiece by use of the tool and material data that represent physical characteristics and a shape of the workpiece;
a processor configured to perform, based on the tool data, the cutting data and the material data, an analysis of deformation of the workpiece due to a cutting force and an analysis of brittle fracture due to the deformation, and perform a prediction of an occurrence of defect or a non-occurrence of defect of the workpiece due to the cutting process; and
an interface configured to output a result of the prediction, and
wherein the processor further executes a program to perform the function of:
a first energy amount prediction processing section configured to predict, based on the tool data, the cutting data and the material data, a cutting force that the tool applies to the workpiece by the cutting process and predict a first energy amount that is an amount of elastic strain energy of the workpiece that is released by a crack growth of the workpiece under the cutting force;

a second energy amount prediction processing section configured to predict, based on at least the material data, a second energy amount that is a surface energy of a new surface of the workpiece that is generated by a crack growth of the workpiece; and a defect prediction processing section configured to compare the first energy amount and the second energy amount to predict the occurrence of defect or the non-occurrence of defect.

4. The low toughness workpiece cutting apparatus according to claim 3, wherein the processor is configured to modify, when having predicted the occurrence of defect, at least one of the tool data and the cutting data, and to compare again the first energy amount and the second energy amount to predict again the occurrence of defect or the non-occurrence of defect.

5. The low toughness workpiece cutting apparatus according to claim 4, wherein the processor further executes the program to perform the function of:

a modification processing section configured to modify at least one of the tool data and the cutting data so that no defect occurs.

6. The low toughness workpiece cutting apparatus according to claim 1, wherein the processing apparatus is configured to perform the processing based on the control signal.

7. A low toughness workpiece manufacturing method executed by a computer, the method including:

preparing tool data that represent physical characteristics and a shape of a tool, cutting data that represent a group of parameters of a cutting process to be performed to a workpiece by use of the tool and material data that represent physical characteristics and a shape of the workpiece;

performing, based on the tool data, the cutting data and the material data, an analysis of deformation of the workpiece due to a cutting force and an analysis of brittle fracture due to the deformation, performing a prediction of an occurrence of defect or a non-occurrence of defect of the workpiece due to the cutting process;

outputting a result of the prediction;

generating, based on the outputting of the result of the prediction of the occurrence of the defect or the non-occurrence of the defect, a control signal for controlling a processing apparatus that performs a processing including the cutting process by use of the tool to the workpiece; and outputting the control signal to the processing apparatus.

8. A low toughness workpiece manufacturing method executed by a computer, the method including:

preparing tool data that represent physical characteristics and a shape of a tool, cutting data that represent a group of parameters of a cutting process to be performed to a workpiece by use of the tool and material data that represent physical characteristics and a shape of the workpiece;

performing, based on the tool data, the cutting data and the material data, an analysis of deformation of the workpiece due to a cutting force and an analysis of brittle fracture due to the deformation, performing a prediction of an occurrence of defect or a non-occurrence of defect of the workpiece due to the cutting process;

outputting a result of the prediction;

calculating, based on a plurality of combinations of parameters included in the tool data, the cutting data and the material data, a stress intensity factor;

comparing, based on the plurality of combinations, a fracture toughness value related to a material of the workpiece and the stress intensity factor;

calculating, based on the plurality of combinations, a process efficiency of the cutting process; and selecting, from the plurality of combinations, a combination with which the process efficiency becomes maximal in a predetermined range in which the stress intensity factor does not exceed the fracture toughness value and deciding the selected combination as a cutting condition.

9. A low toughness workpiece manufacturing method executed by a computer, the method including:

preparing tool data that represent physical characteristics and a shape of a tool, cutting data that represent a group of parameters of a cutting process to be performed to a workpiece by use of the tool and material data that represent physical characteristics and a shape of the workpiece;

performing, based on the tool data, the cutting data and the material data, an analysis of deformation of the workpiece due to a cutting force and an analysis of brittle fracture due to the deformation, performing a prediction of an occurrence of defect or a non-occurrence of defect of the workpiece due to the cutting process;

outputting a result of the prediction;

predicting, based on the tool data, the cutting data and the material data, a cutting force that the tool applies to the workpiece by the cutting process and predicting a first energy amount that is an amount of elastic strain energy of the workpiece that is released by a crack growth of the workpiece under the cutting force;

predicting, based on the cutting data and the material data, a second energy amount that is a surface energy of a new surface of the workpiece that is generated by a crack growth of the workpiece; and comparing the first energy amount and the second energy amount to predict the occurrence of defect or the non-occurrence of defect.

10. The low toughness workpiece manufacturing method according to claim 7, further comprising:

performing the processing based on the control signal.

11. A non-transitory computer-readable recording medium storing a low toughness workpiece manufacturing program, which when executed by a computer perform steps comprising:

preparing tool data that represent physical characteristics and a shape of a tool, cutting data that represent a group of parameters of a cutting process to be performed to a workpiece by use of the tool and material data that represent physical characteristics and a shape of the workpiece;

performing, based on the tool data, the cutting data and the material data, an analysis of deformation of the workpiece due to a cutting force and an analysis of brittle fracture due to the deformation, performing a prediction of an occurrence of defect or a non-occurrence of defect of the workpiece due to the cutting process;

outputting a result of the prediction;

generating, based on the outputting of the result of the prediction of the occurrence of the defect or the non-occurrence of the defect, a control signal for controlling a processing apparatus that performs a processing including the cutting process by use of the tool to the workpiece; and outputting the control signal to the processing apparatus.

12. A non-transitory computer-readable recording medium storing a low toughness workpiece manufacturing program, which when executed by a computer perform steps comprising:

preparing tool data that represent physical characteristics and a shape of a tool, cutting data that represent a group of parameters of a cutting process to be performed to a workpiece by use of the tool and material data that represent physical characteristics and a shape of the workpiece;

performing, based on the tool data, the cutting data and the material data, an analysis of deformation of the workpiece due to a cutting force and an analysis of brittle fracture due to the deformation, performing a prediction of an occurrence of defect or a non-occurrence of defect of the workpiece due to the cutting process;

outputting a result of the prediction;

calculating, based on a plurality of combinations of parameters included in the tool data, the cutting data and the material data, a stress intensity factor;

comparing, based on the plurality of combinations, a fracture toughness value related to a material of the workpiece and the stress intensity factor;

calculating, based on the plurality of combinations, a process efficiency of the cutting process; and selecting, from the plurality of combinations, a combination with which the process efficiency becomes maximal in a predetermined range in which the stress intensity factor does not exceed the fracture toughness value to decide the selected combination as a cutting condition.

13. A non-transitory computer-readable recording medium storing a low toughness workpiece manufacturing program, which when executed by a computer perform steps comprising:

preparing tool data that represent physical characteristics and a shape of a tool, cutting data that represent a group of parameters of a cutting process to be performed to a workpiece by use of the tool and material data that represent physical characteristics and a shape of the workpiece;

performing, based on the tool data, the cutting data and the material data, an analysis of deformation of the workpiece due to a cutting force and an analysis of brittle fracture due to the deformation, performing a prediction of an occurrence of defect or a non-occurrence of defect of the workpiece due to the cutting process;

outputting a result of the prediction;

predicting, based on the tool data, the cutting data and the material data, a cutting force that the tool applies to the workpiece by the cutting process and predicting a first energy amount that is an amount of elastic strain energy of the workpiece that is released by a crack growth of the workpiece under the cutting force;

predicting, based on the cutting data and the material data, a second energy amount that is a surface energy of a new surface of the workpiece that is generated by a crack growth of the workpiece; and comparing the first energy amount and the second energy amount to predict the occurrence of defect or the non-occurrence of defect.

14. The non-transitory computer-readable recording medium according to claim 11, storing the low toughness workpiece manufacturing program, further including:

performing the processing based on the control signal.

* * * * *